United States Patent [19]

Kent

[11] 4,423,181

[45] Dec. 27, 1983

[54] POLYETHYLENE-POLYBUTADIENE BLEND

[75] Inventor: Eric G. Kent, Sarnia, Canada

[73] Assignee: Polysar Limited, Sarnia, Canada

[21] Appl. No.: 388,223

[22] Filed: Jun. 14, 1982

Related U.S. Application Data

[63] Continuation-in-part of Ser. No. 232,625, Feb. 9, 1981, abandoned.

[30] Foreign Application Priority Data

Mar. 10, 1980 [CA] Canada ................................. 347358

[51] Int. Cl.³ .................... C08L 9/00; C08L 23/06; C08K 3/00; C08K 3/26
[52] U.S. Cl. .................................... 524/425; 524/430; 524/431; 524/437; 524/441; 524/449; 524/451; 524/456; 525/232; 525/236
[58] Field of Search ............... 525/232, 236; 524/425, 524/431, 441, 449, 451, 450, 430, 437

[56] References Cited

U.S. PATENT DOCUMENTS

| | | | |
|---|---|---|---|
| 2,832,748 | 4/1958 | Safford | 525/232 |
| 2,834,751 | 5/1958 | Jones | 525/232 |
| 2,877,206 | 3/1959 | Scott | 525/232 |
| 2,912,410 | 11/1959 | Cole | 525/232 |
| 2,997,453 | 8/1961 | Short et al. | 525/232 |
| 3,060,989 | 10/1962 | Railsback et al. | 525/236 |
| 3,123,583 | 3/1964 | Howard et al. | 525/232 |
| 3,159,691 | 12/1964 | Kraus | 525/236 |
| 3,299,181 | 1/1967 | Coover et al. | 525/232 |
| 3,981,830 | 9/1976 | Takeuchi et al. | 525/232 |
| 4,081,414 | 3/1978 | Abe et al. | 525/232 |
| 4,324,866 | 4/1982 | Furuichi et al. | 525/236 |

FOREIGN PATENT DOCUMENTS

| | | | |
|---|---|---|---|
| 794878 | 9/1968 | Canada | 525/232 |
| 1105118 | 3/1968 | United Kingdom | 525/232 |
| 1120572 | 7/1968 | United Kingdom | 525/232 |
| 1354465 | 5/1974 | United Kingdom | 525/232 |

OTHER PUBLICATIONS

Derwent Abs. 690264/39 (DL126458) Stenzel 7-1977.

*Primary Examiner*—Melvyn I. Marquis
*Assistant Examiner*—Herbert J. Lilling
*Attorney, Agent, or Firm*—Stevens, Davis, Miller & Mosher

[57] ABSTRACT

Compositions having improved low temperature impact strength are provided which comprise a mixture of high density polyethylene and polybutadiene. Such compositions may be used for coating of pipes, especially for Arctic-type use conditions or for containers for low temperature use.

6 Claims, No Drawings

POLYETHYLENE-POLYBUTADIENE BLEND

This is a continuation-in-part of application Ser. No. 232,625 filed Feb. 9, 1981, now abandoned.

This invention is directed to a thermoplastic composition having improved low temperature impact properties.

Polymers of the alpha-olefins are well known. Ethylene can be polymerized by numerous methods to yield polymers having a wide range of properties, including a range of densities and a range of melt flow indices. Certain types of polyethylene, because of the high strength properties, may be used to form coverings, coatings or articles wherein high strength, including impact strength, is required. However, as the service temperature is reduced the impact strength also falls off. It is well known in the art that the low temperature impact strength of polyethylene can be markedly improved by incorporating into the polyethylene small amounts of polyisobutylene or of isobutylene-isoprene polymer.

British Pat. No. 999,827 teaches that improved low temperature impact strength is achieved by blending 3 to 15 parts of polybutadiene with 100 parts of polypropylene. British Pat. No. 1,105,118 teaches that improved rubber compositions for use in tire tread stocks contain polybutadiene and a second elastomer plus small quantities of polyethylene. Canadian Pat. No. 838,220 teaches blends of isotactic polypropylene and 2 to 10 parts of polybutadiene, the blends having improved low temperature impact resistance. U.S. Pat. No. 2,832,748 teaches vulcanizable compositions containing polyethylene, polybutadiene having at least 30% 1,2-content and a peroxide. U.S. Pat. No. 2,834,751 teaches blends of polyethylene and of a pllybutadiene in which at least 50% of the double bonds have been hydrogenated.

It is an objective of this invention to provide novel thermoplastic compositions having improved low temperature impact properties which compositions comprise a high density polyethylene admixed with a stereospecific polybutadiene.

In accordance with my invention, there is provided a thermoplastic composition having improved low temperature impact properties which composition comprises, per 100 parts by weight of polymer components, from about 80 to about 95 parts by weight of polyethylene having a density of from about 0.95 to about 0.965 g/cm$^3$ and from about 5 to about 20 parts by weight of an unhydrogenated polybutadiene having from about 85 to about 98 percent of 1,4-content and having about 95 to 100% of the theoretical unsaturation.

Polyethylene is well known in the market place and can be obtained as having a low density, such as from about 0.915 to about 0.935 g/cm$^3$, or as having a high density, such as from about 0.94 to about 0.965 g/cm$^3$. In my invention, I use high density polymer and specifically I use polyethylene having a density of from about 0.95 to about 0.965 g/cm$^3$. The density is determined by either of ASTM D 792 or ASTM D 1505: I prefer to use ASTM D 1505 for determining the density of the high density polyethylene that I use in my invention.

Polybutadiene is well known in the market place. It may be prepared by the polymerization of butadiene monomer in the presence of a suitable catalyst, such as an alkyl lithium compound (e.g. butyl lithium), or a cobalt salt/aluminum alkyl halide combination (e.g. cobalt octoate/diethyl aluminum chloride), or a titanium salt/aluminum alkyl combination (e.g. titanium tetraiodide/triethyl aluminum), or a nickel compound/boron trifluoride etherate/aluminum alkyl (e.g. nickel octoate/boron trifluoride etherate/triethyl aluminum), to yield polybutadiene having from about 85 to about 98 percent of 1,4-content. Polybutadiene prepared with an alkyl lithium catalyst has a 1,2-content of from about 10 to about 15 percent, and a 1,4-content of from about 85 to about 90 percent, the 1,4-content generally being about 32–35 percent cis-1,4 and about 55–58 percent trans-1,4. Polybutadienes prepared with the cobalt, titanium or nickel catalysts generally have a 1,4-content of from about 95 to about 98 percent and a 1,2-content of from about 2 to about 5 percent, of which the cis-1,4 content is generally from about 90 to about 97 or 98 percent. The 1,2 and 1,4-contents of such polymers may be readily determined by well known methods including infra red spectroscopy and nuclear magnetic resonance. Such polybutadienes are used without hydrogenation and contain from about 95 to 100% of the theoretical unsaturation.

The compositions of my invention are readily prepared by mixing the polyethylene and polybutadiene at a temperature above the melting point of the polyethylene. The mixing may be on an open two roll mixer or in an internal mixer. The polyethylene is fed to the mixer, preheated to a temperature of about 120° to 155° C., and fluxed until a uniform melt is produced (about 2 to 3 minutes) following which the polybutadiene, preferably precut into small chunks, is added and the mixing continued until a uniform mixture is produced (about 5 to 7 minutes). The mixture is removed and cooled and may be sheeted out or pelletized.

The quantity of polybutadiene that I add to the high density polyethylene is from about 5 to about 20 parts by weight per about 80 to about 95 parts by weight of polyethylene for a total of 100 parts by weight of polyethylene plus polybutadiene. In a preferred embodiment, I use from about 7.5 to about 15 parts by weight of polybutadiene with about 85 to about 92.5 parts by weight of polyethylene. Of the polybutadienes having about 85 to about 98 percent of 1,4-content, I prefer to use either the polybutadiene prepared with an alkyl lithium catalyst, especially that sold under the Trademark DIENE which is believed to have a 1,2-content of about 10 to about 15 percent, about 32–35 percent of cis-1,4 and about 55–58 percent of trans-1,4 or the polybutadiene prepared with a cobalt catalyst, especially that sold under the Trademark TAKTENE which is believed to have a 1,2-content of about 1-2 percent, a trans-1,4 content of about 1-2 percent and a cis-1,4 content of about 96-98 percent.

I also contemplate as within the scope of my invention the addition of certain fillers and additives to the polyethylene-polybutadiene mixtures. Fillers selected from talc, mica, calcium carbonate, alumina and wollastonite may be added in amounts from 0 to about 30 parts by weight per 100 parts by weight of polyethylene-polybutadiene mixture. Other additives such as antioxidants or stabilizers, coloring agents and antiozonants may be added, generally in individual amounts of up to about 1.5–3 parts by weight per 100 parts by weight of the polyethylene-polybutadiene mixture. Such fillers or additives may be incorporated into the mixture after the polyethylene has been fluxed or after the polybutadiene has been uniformly mixed into the polyethylene.

The compositions of my invention possess unexpected properties. The impact strength of a composition according to my invention is from about 125 to about 175 percent of the impact strength of the pure polyethylene at room temperature. But, and most significantly, as the test temperature is lowered the impact strength increases remarkably, such that at −40° C., the impact strength of my compositions is from about 270 to about 320 percent of the impact strength of the pure polyethylene at −40° C. and at −51° C., the impact strength of my compositions is from about 170 to about 1450 percent of the impact strength of the pure polyethylene at −51° C. This is all the more unexpected because low density polyethylene and polypropylene do not exhibit similar improvements in impact strength.

The compositions of my invention may be used for pipe and sheet metal coating, especially for Arctic-type use conditions, containers especially for low temperature use and like applications.

In the following examples, all parts are by weight and the test procedures used were ASTM D 790 for flexural modulus and flexural strength and for Izod impact ASTM D 256 Method B using 0.125 inch bars with the specimens cooled to the test temperatures other than +23° C. and being tested immediately after removal from the controlled temperature environment. Specimens were injection molded using a Van Dorn 50-RS-3F Injection Molder using the following conditions:

|  | High Density Polyethylene | Low Density Polyethylene | Polypropylene |
|---|---|---|---|
| Front Zone °C. | 199 | 163 | 199 |
| Rear Zone °C. | 199 | 163 | 199 |
| Mold Temp. °C. | 49 | 49 | 49 |
| Screw Speed |  | Medium Fast |  |
| Injection Pressure kg/cm$^2$ | 70.4 | 49.3 | 52.8 |
| Molding Pressure kg/cm$^2$ | 52.8 | 28.1 | 31.7 |
| Total Cycle Time seconds | 25 | 25 | 25 |

EXAMPLE 1

Polyethylene pellets were added to a two roll mill (preheated to and controlled at a temperature of 150° to 152° C.) and fluxed for 2 to 3 minutes, at which time polybutadiene which had been cut into pieces of about 1.5 cm cubic form was added and the mixing was continued for a total time of 6–7 minutes to yield a homogeneous mixture which was taken off the mill as a sheet and, when cool, ground up into small pellets. The pellets were fed to the injection molding machine to produce the test specimens.

The polyethylene used, Dow polyethylene 80060, had a density, as provided by the supplier, of 0.96 g/cm$^3$. Polybutadiene-1 was TAKTENE 1220 (TAKTENE is a registered Trademark) supplied by Polysar Limited and had a cis-1,4 content of 96–97%. Polybutadiene-2 was DIENE 55 (DIENE is a registered Trademark) supplied by Firestone Tire and Rubber Company and is believed to have a 1,2-content of about 11 to 12%, the balance being 1,4. Both polybutadienes contained about 100% of the theoretical unsaturation.

The specific recipes and test results are shown in Table 1 and the remarkable improvement in low temperature impact strength is readily apparent.

TABLE 1

| Experiment No. | 1 | 2 | 3 | 4 | 5 | 6 |
|---|---|---|---|---|---|---|
| Polyethylene wt. | 100 | 95 | 92.5 | 90 | 92.5 | 90 |
| Polybutadiene-1 wt. | — | 5 | 7.5 | 10 | — | — |
| Polybutadiene-2 wt. | — | — | — | — | 7.5 | 10 |
| Izod Impact |  |  |  |  |  |  |
| at +23° C. ft. lbs/in. | 8.8 | 10.9 | 14.6 | 13.8 | 16.0 | 15.7 |
| −29° C. ft. lbs/in. | 5.2 | 14.6 | 16.9 | 18.0 | 18.8 | 19.8 |
| −40° C. ft. lbs/in. | 5.7 | 15.5 | 16.7 | 18.2 | 18.6 | 19.2 |
| −45° C. ft. lbs/in. | 1.4 | 7.8 | 15.9 | 17.4 | 18.7 | 19.9 |
| −51° C. ft. lbs/in. | 1.4 | 2.4 | 14.9 | 20.5 | 18.7 | 19.3 |
| −62° C. ft. lbs/in. | 1.4 | 1.8 | 2.2 | 2.4 | 17.0 | 19.3 |
| Flexural Modulus kg/cm$^2$ | 6790 | 5745 | 5655 | 4975 | 5950 | 5580 |
| Flexural Strength kg/cm$^2$ | 173 | 150 | 140 | 132 | 142 | 135 |

EXAMPLE 2

Following the procedure described in Example 1, the compositions as shown in Table 2 were prepared. The mica was added after the polybutadiene had been mixed into the fluxing polyethylene, the mixing time being a total of about 7 minutes. The polybutadiene used was polybutadiene-1 of Example 1, Experiment No. 1 of Example 1 is included as a control. The improvement in impact strength at the very low temperatures can be seen.

TABLE 2

| Experiment No. | 1 | 10 | 11 | 12 | 13 | 14 | 15 |
|---|---|---|---|---|---|---|---|
| Polyethylene wt. | 100 | 90 | 90 | 90 | 80 | 80 | 80 |
| Polybutadiene wt. | — | 10 | 10 | 10 | 20 | 20 | 20 |
| Mica wt. | — | 10 | 20 | 30 | 10 | 20 | 30 |
| Izod Impact |  |  |  |  |  |  |  |
| at +23° C. ft. lbs/in. | 8.8 | 9.1 | 5.6 | 4.6 | 13.6 | 12.9 | 10.6 |
| −40° C. ft. lbs/in. | 5.7 | 4.6 | 3.0 | 2.5 | 11.9 | 7.2 | 4.4 |
| −51° C. ft. lbs/in. | 1.4 | 2.7 | 2.4 | 2.2 | 8.3 | 3.8 | 3.3 |
| −62° C. ft. lbs/in. | 1.4 | 1.9 | 1.8 | 1.7 | 3.4 | 2.4 | 2.3 |
| Flexural Modulus kg/cm$^2$ | 6790 | 6320 | 7410 | 7630 | 4245 | 4790 | 4915 |
| Flexural Strength kg/cm$^2$ | 173 | 137 | 144 | 152 | 102 | 105 | 108 |

EXAMPLE 3

The compositions shown in Table 3 were prepared following the procedure described in Examples 1 and 2. The polybutadiene used was polybutadiene-2 of Example 1. Experiment No. 1 of Example 1 is included as a control. The improved low temperature impact strength can be seen.

TABLE 3

| Experiment No. | 1 | 20 | 21 |
|---|---|---|---|
| Polyethylene wt. | 100 | 92.5 | 90 |
| Polybutadiene wt. | — | 7.5 | 10 |
| Mica wt. | — | 30 | 30 |
| Izod Impact |  |  |  |
| at +23° C. ft. lbs/in. | 8.8 | 3.4 | 5.4 |
| −29° C. ft. lbs/in. | 5.2 | 2.4 | 2.9 |
| −40° C. ft. lbs/in. | 5.7 | 2.0 | 2.6 |
| −45° C. ft. lbs/in. | 1.4 | 1.9 | 2.5 |
| −51° C. ft. lbs/in. | 1.4 | 1.7 | 2.1 |
| −62° C. ft. lbs/in. | 1.4 | 1.6 | 1.8 |
| Flexural Modulus kg/cm$^2$ | 6790 | 8425 | 8045 |
| Flexural Strength kg/cm$^2$ | 173 | 174 | 156 |

EXAMPLE 4

Mixtures were prepared according to the present invention of high density polyethylene and polybutadiene-1 as in Example 1, and as comparative compositions of a low density polyethylene and polybutadiene-1 of Example 1 and of a polypropylene and polybutadiene-1 of Example 1. The recipes and test results are shown in Table 4. The low density polyethylene was Dow polyethylene 532 and had a density, as provided by the supplier, of 0.923 gms/cm³. The polypropylene was Hercules PRO-FAX 6524 (PRO-FAX is a registered Trademark) and had a density, as provided by the supplier, of 0.903 gms/cm³. The high density polyethylene-polybutadiene mix was prepared on a two roll mill with the rolls at a temperature of 149° to 155° C., the low density polyethylene-polybutadiene mix was prepared on the two roll mill with the rolls at a temperature of 105° to 110° C. and the polypropylene-polybutadiene mix was prepared on the two roll mill with the rolls at a temperature of 170° to 173° C.

The results shown in Table 4 clearly demonstrate the most unexpected improvement in low temperature impact strength of the compositions of the present invention.

TABLE 4

| Experiment No. | 31 | 32 | 33 | 34 | 35 | 36 |
|---|---|---|---|---|---|---|
| High Density Polyethylene wt. | 100 | 90 | — | — | — | — |
| Low Density Polyethylene wt. | — | — | 100 | 90 | — | — |
| Polypropylene wt. | — | — | — | — | 100 | 90 |
| Polybutadiene wt. | — | 10 | — | 10 | — | 10 |
| Izod Impact | | | | | | |
| at +23° C. ft. lbs/in. | 9.3 | 14.3 | 8.4 | 7.4 | 0.3 | 0.9 |
| −40° C. ft. lbs/in. | 6.4 | 13.4 | 0.7 | 1.0 | 0.4 | 0.4 |
| −51° C. ft. lbs/in. | 1.6 | 15.2 | 0.7 | 1.0 | 0.3 | 0.4 |
| Flexural Modulus kg/cm² | 7520 | 6085 | 1450 | 1175 | 11160 | 9580 |
| Flexural Strength kg/cm² | 176 | 136 | 60 | 50 | 317 | 274 |

What is claimed is:

1. A process for the production of a thermoplastic composition having improved low temperature impact properties comprising, per 100 parts by weight of polymer components, from about 80 to about 95 parts by weight of polyethylene having a density of from about 0.95 to about 0.965 g/cm³ and from about 5 to about 20 parts by weight of an unhydrogenated polybutadiene having from about 85 to about 98 percent of 1,4-content and having from about 95 to 100 percent of the theoretical unsaturation, in which process the polyethylene is supplied to a two roll mill or an internal mixer preheated to a temperature of about 120° to 155° C. and fluxed for 2 to 3 minutes, the polybutadiene is added and the mixing continued for about 5 to 7 minutes to produce a uniform mixture, after which the mixture is removed and cooled.

2. The process of claim 1 wherein the polybutadiene has a 1,2-content of from about 10 to about 15 percent and a 1,4-content of from about 85 to about 90 percent.

3. The process of claim 1 wherein the polybutadiene has a 1,2-content of from about 2 to about 5 percent and a 1,4-content of from about 95 to about 98 percent.

4. The process of claim 1 wherein up to 30 parts by weight of a filler selected from talc, mica, calcium carbonate, alumina and wollastonite is added after the polyethylene has been fluxed.

5. The process of claim 1 wherein the composition comprises from about 7.5 to about 15 parts by weight of polybutadiene and from about 85 to about 92.5 parts by weight of polyethylene.

6. The process of claim 1 wherein up to 30 parts by weight of a filler selected from talc, mica, calcium carbonate, alumina and wollastonite is added after the polybutadiene has been mixed into the polyethylene.

* * * * *